United States Patent
Castel et al.

(10) Patent No.: US 9,534,713 B2
(45) Date of Patent: Jan. 3, 2017

(54) ASSEMBLY CONSISTING OF A FLEXIBLE TUBULAR PIPE FOR TRANSPORTING HYDROCARBON FLUIDS AND A SECONDARY METAL TUBE

(71) Applicant: TECHNIP FRANCE, Courbevoie (FR)

(72) Inventors: Yves Castel, La Vaupaliere (FR); Alexandre Levet, Rouen (FR)

(73) Assignee: TECHNIP FRANCE (FR)

( * ) Notice: Subject to any disclaimer, the term of this patent is extended or adjusted under 35 U.S.C. 154(b) by 329 days.

(21) Appl. No.: 14/390,317

(22) PCT Filed: Apr. 2, 2013

(86) PCT No.: PCT/EP2013/056860
§ 371 (c)(1),
(2) Date: Oct. 2, 2014

(87) PCT Pub. No.: WO2013/149983
PCT Pub. Date: Oct. 10, 2013

(65) Prior Publication Data
US 2015/0059909 A1    Mar. 5, 2015

(30) Foreign Application Priority Data

Apr. 4, 2012 (FR) .................................. 12 53111

(51) Int. Cl.
*F16L 11/00* (2006.01)
*F16L 11/08* (2006.01)
(Continued)

(52) U.S. Cl.
CPC ................ *F16L 11/08* (2013.01); *B23P 15/00* (2013.01); *B23P 19/04* (2013.01); *F16L 11/083* (2013.01);
(Continued)

(58) Field of Classification Search
CPC .................................. F16L 11/08; F16B 37/12
(Continued)

(56) References Cited

U.S. PATENT DOCUMENTS 2,354,810 A * 8/1944 Haas ........................ F16B 37/12
                                                                29/240.5
2,751,238 A * 6/1956 Vegren ..................... F16B 3/04
                                                                285/92
(Continued)

FOREIGN PATENT DOCUMENTS

EP      2 230 432 A2    9/2010
FR      1 391 946       3/1965
(Continued)

OTHER PUBLICATIONS

International Search Report dated Jun. 4, 2013 issued in corresponding International patent application No. PCT/EP2013/056860.

*Primary Examiner* — Patrick F Brinson
(74) *Attorney, Agent, or Firm* — Ostrolenk Faber LLP

(57) ABSTRACT

An assembly, which consists of a flexible tubular pipe (1) for transporting hydrocarbon fluids including a metal carcass (10) produced by the short pitched helical winding of a profiled strip, the said strip defining a plurality of intervening gaps (10a) between each winding turn (10b), an inner polymeric sealing sheath, at least one metal armor layer, and an outer polymeric sheath, and of a secondary metal tube (2) coaxial to the tubular pipe (1).

19 Claims, 3 Drawing Sheets

(51) Int. Cl.
*F16L 11/16* (2006.01)
*F16L 33/01* (2006.01)
*B23P 15/00* (2006.01)
*B23P 19/04* (2006.01)

(52) U.S. Cl.
CPC ............... *F16L 11/16* (2013.01); *F16L 33/01* (2013.01); *Y10T 29/4997* (2015.01); *Y10T 29/49879* (2015.01); *Y10T 29/49948* (2015.01); *Y10T 29/49966* (2015.01)

(58) Field of Classification Search
USPC . 138/134, 135, 109, 155; 285/334; 411/438, 178
See application file for complete search history.

(56) References Cited

U.S. PATENT DOCUMENTS

| | | | | |
|---|---|---|---|---|
| 3,062,568 | A * | 11/1962 | Andresen | E21B 17/042 285/333 |
| 3,902,745 | A | 9/1975 | Mooney et al. | |
| 3,918,749 | A * | 11/1975 | Taylor | B65G 53/32 138/109 |
| 4,099,748 | A * | 7/1978 | Kavick | F16L 33/2076 285/256 |
| 5,224,739 | A * | 7/1993 | Sauter | F01N 13/082 181/228 |
| 6,224,311 | B1 * | 5/2001 | Lutkus | B05D 5/083 411/178 |
| 6,494,659 | B1 * | 12/2002 | Lutkus | F16B 37/12 411/438 |
| 7,318,454 | B2 * | 1/2008 | Dupoiron | F15D 1/065 138/134 |
| 2006/0186664 | A1 | 8/2006 | Huang | |
| 2008/0277932 | A1 * | 11/2008 | Grubert | F16B 37/12 285/334 |
| 2014/0023453 | A1 * | 1/2014 | Hollensen | F16B 37/12 411/178 |

FOREIGN PATENT DOCUMENTS

| | | |
|---|---|---|
| GB | 1022380 | 3/1966 |
| WO | WO 99/19656 A1 | 4/1999 |
| WO | WO 01/50056 A1 | 7/2001 |

* cited by examiner

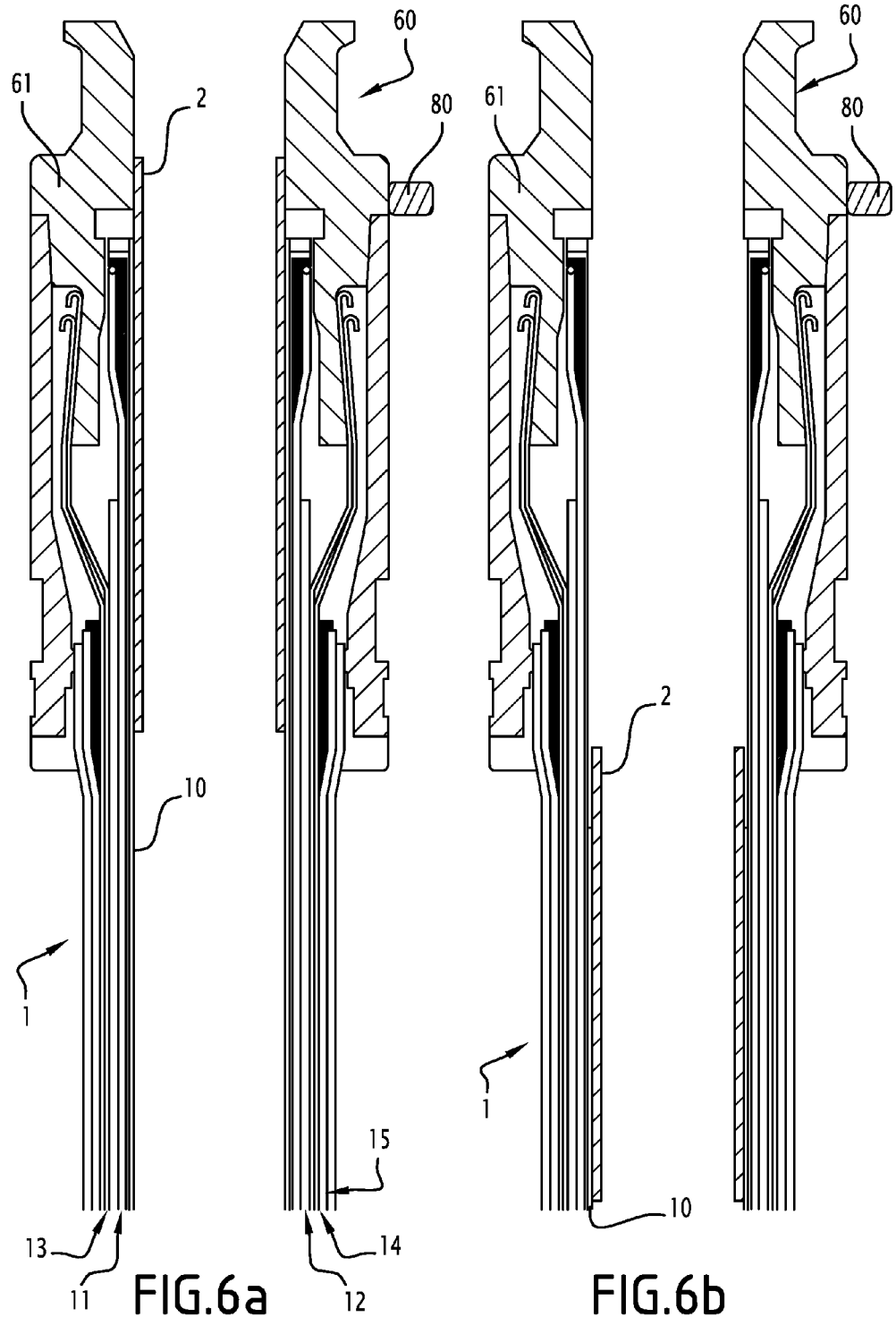

ASSEMBLY CONSISTING OF A FLEXIBLE TUBULAR PIPE FOR TRANSPORTING HYDROCARBON FLUIDS AND A SECONDARY METAL TUBE

CROSS REFERENCE TO RELATED APPLICATIONS

The present application is a 35 U.S.C. §371 National Phase conversion of PCT/EP2013/056860, filed Apr. 2, 2013, which claims benefit of French Application No. 1253111, filed Apr. 4, 2012, the disclosure of which is incorporated herein by reference. The PCT International Application was published in the French language.

TECHNICAL FIELD OF THE INVENTION

The present invention relates to an assembly of a flexible tubular pipe for transporting hydrocarbon fluids with a secondary metal tube coaxial to the tubular pipe.

The invention also relates to a method for mounting an assembly of a pipe with a secondary metal tube.

BACKGROUND OF THE INVENTION

The flexible tubular pipes according to the invention, that are well known to the person skilled in the art, are used primarily for extracting oil offshore and are for example defined by the standard API RP 17J or 17B API of the American Petroleum Institute (API). Generally, the structure consists of a superposition of several layers, which include: a metal carcass, an inner polymeric sealing sheath or "pressure sheath", armour layers wound on the outside around the pressure sheath in order to be able to withstand the compressive forces exerted by the flow of petroleum fluid and the longitudinal tensile stress. At least one first armour layer comprises of at least one armour wire wound with short pitched winding over the impervious sheath and forming contiguous turns or a "pressure vault". And at least one second armour layer comprising of armour wires wound with long pitched winding, is arranged around the pressure vault. Usually, an outer polymeric sheath is extruded over the at least one second armour layer.

A technology known from the state of the art, in particular from the document WO 99/19656, involves executing the assembling of a metal carcass for a flexible tubular pipe with an additional element in a manner so as to facilitate the anchoring thereof within a connecting end fitting.

The additional element is a lock ring positioned at the end of the metal carcass and intended to cooperate with a groove provided in the connecting end fitting by means of a screwing action along a thread defined by the winding of the profiled metal strips.

The lock ring is fixed on to the carcass by means of welding or quite simply by making use of a screw, in order to hold the assembly together securely. However, such an assembly presents the disadvantage of not having the ability to easily adapt to any type of carcass: the manufacture of the lock ring being dependent on the dimension of the outer diameter of the carcass around which it is intended to be mounted. On the other hand, the assembly may require the use of a weld seam to hold the ring and carcass together in an integrally secure manner, which represents an extra operation and thus does not allow for the possibility of having the assembly assembled in an irreversible manner.

Furthermore, in the document WO 01/50056, a description is given of the assembling of at least two sections of metal carcass of flexible tubular pipe connected to one another. Each section of the carcass, formed by the winding of a plurality of profiled strips describe a screw thread.

In advance, two holes are machined into each of the sections. The first section is positioned coaxially with respect to the subsequent section and they are then fixed to each other by means of an operation of screwing the two profiled strips together until the two holes machined into each of them coincide. They are then held together in an integrally secured manner by means of screw-nut systems. One of the disadvantages of this type of assembly is that it is necessary for each section of carcass to be machined in order to connect them to each other. Such a machining process may eventually lead to the phenomena of localised corrosion and/or to problems related to mechanical strength and resistance to tensile stresses.

SUMMARY OF THE INVENTION

The present invention seeks to overcome the drawbacks cited above and relates to an assembly of a flexible tubular pipe for transporting hydrocarbon fluids that comprises:
 a metal carcass made by a short pitched helical winding of a profiled strip, the said strip defining a plurality of intervening gaps between each winding turn;
 an inner polymeric sealing sheath;
 at the least one metal armour layer; and
 an outer polymeric sheath;
 with a secondary metal tube coaxial to the tubular pipe, characterised in that a fastening element comprising of at least two non-touching turns is inserted within the metal carcass and cooperates with the plurality of intervening gaps and in that at least one of the ends of the said secondary metal tube has a short pitched thread defining a helical groove, the said groove being screwed in with the at least two non-touching turns of the said fastening element.

Thus, an assembly according to the invention provides certain advantages. Indeed, such an assembly presents the advantage of the ability to be easily and quickly installed on the pipe lines for transporting hydrocarbon fluids, pre installed in advance, connected and in service on an oil rig or on any other types of semi-submersible units, such as floating unit types including SPAR platforms or TLP (Tension Leg Platform) or such as the floating units for production, storage and offloading of the type known as FPSO (Floating Production, Storage & Offloading), etc. In fact, the installation of the offshore assembly, calls for few parts and requires no additional action, like a drilling or welding operation, for example. Furthermore, since the characteristic features of the pipe, and more precisely those of the carcass are known, the component elements constituting the assembly are constructed onshore functionally. Finally, in accordance with the invention, the assembly can be entirely disassembled, without causing any damage to the carcass.

The assembly according to the invention may include one or more of the following characteristic features, taken into consideration individually or in accordance with any technically possible combination:
 preferably, the diameter of the said at least two non-touching turns of the fastening element is chosen to be equal to 110% of the inner diameter of the profiled strip of the metal carcass;
 advantageously, the at least two turns of the fastening element in contact with the plurality of intervening gaps exert a radial force on the carcass;
 according to one particular embodiment of the invention, the distance between the inner diameter of the metal carcass and the inner diameter of the fastening element is at least equal to 1.5 millimeters (mm);

preferably, the fastening element includes at least at one of its ends, a fastening tab which extends radially and towards the interior of the volume defined by the diameter of the turns;

in an advantageous manner, the fastening element is a helical coil spring. The use of a helical coil spring allows for quick and easy assembly/disassembly;

according to one form of implementation of the invention, the at least two non-touching turns of the helical coil spring are formed by means of an operation of spiral winding of a steel wire;

according to the preferred embodiment of the invention, the steel wire is made out of stainless steel. Advantageously, a steel of the same type is chosen for the fabrication of the metal carcass and the helical coil spring in order to limit the phenomena of corrosion;

by way of a variant, the steel wire is of a circular cross section;

advantageously the steel wire is of a profiled cross section so as to ensure better cooperation with the plurality of intervening gaps of the carcass and in order to improve its mechanical strength;

in an advantageous manner, the helical coil spring is resistant to a tensile force of between 2 tonnes and 10 tonnes, preferably able to withstand a tensile force of 5 tonnes. Even after a test of resistance to a tensile force of 5 tonnes, the assembly showed no signs of weakness.

The object of the invention also relates to a method for mounting an assembly consisting of a flexible tubular pipe with a secondary metal tube, characterised in that it includes the steps consisting of:

a) hooking the fastening element on to one of two ends of an installation device, b) inserting the installation device relative to the metal carcass;

c) adjusting fit of the fastening element relative to the metal carcass;

d) releasing the fastening element;

e) removing the installation device;

f) positioning and inserting the secondary metal tube relative to the metal carcass; and g) securing the fastening element to the said secondary metal tube.

The method according to the invention may include the following step or steps, taken into consideration individually or in accordance with any technically possible combination:

the step a) comprises a step $a_1$) of bringing about axial compression of the turns, then a step $a_2$) of insertion of the at least one fastening tab of the fastening element into at least one notch provided at one of the ends of the installation device, advantageously followed by a bolting of the said at least one fastening tab relative to the notch;

the step d), has a phase of radial expansion of the turns of the fastening element within the plurality of intervening gaps of the metal carcass;

the step f) includes a step $f_1$) of coaxial centering of the secondary metal tube relative to the inner diameter of the metal carcass and then a step $f_2$) of screwing of the groove of the secondary metal tube into the turns of the fastening element; and the step g) comprises an operation of bolting of the at least one fastening tab of the fastening element with the secondary metal tube;

after the step g), a step $g_1$) of application of a polymer resin between the turns of the fastening element and the secondary metal tube; and the step f) includes a step $f_1$) of coaxial centering of the secondary metal tube relative to the outer diameter of the metal carcass and a step $f_2$) of screwing of the groove of the secondary metal tube into the turns of the fastening element.

BRIEF DESCRIPTION OF THE DRAWINGS

The invention will be better understood upon reading the description that follows, provided by way of example and with reference being made to the accompanying drawings, in which:

FIG. 5 is a partial schematic view in cross section of an assembly, in accordance with the invention;

FIGS. 6a and 6b are partial views of a detection device for detecting the presence of the metal carcass of a flexible pipe according to the invention.

DESCRIPTION OF PREFERRED EMBODIMENTS

Figure 1:
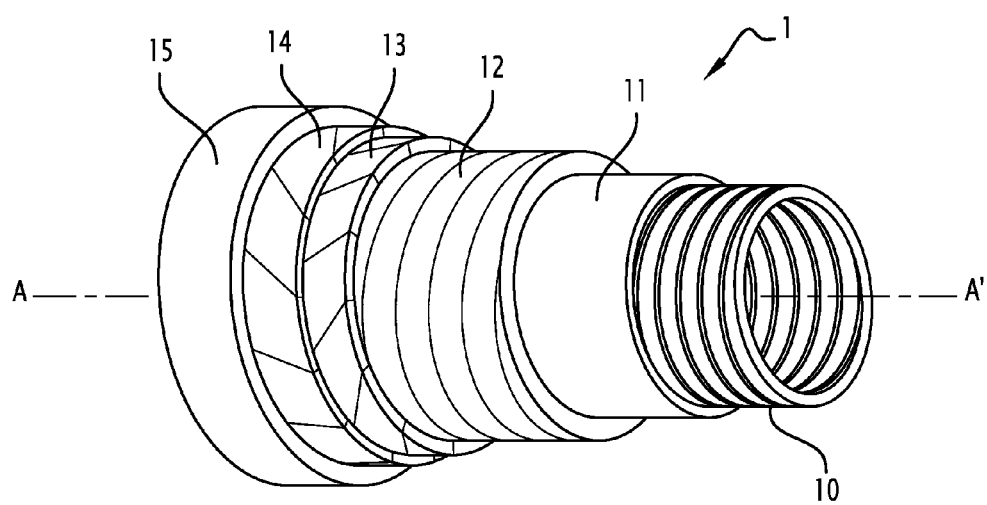
FIG. 1 is a schematic partial cutaway view of a flexible tubular pipe according to the invention.

The flexible tubular pipe 1 according to the invention and well known to the person skilled in the art, is illustrated in FIG. 1. It is formed of a set of various different concentric layers each one superposed over the other, around a longitudinal axis A-A'. The layers are of "unbonded" type and may be moved relative to each other. The pipe shown in FIG. 1 can be used as a rising pipe (known as "risers") or as a pipe that is laid on the seabed (known as "flowlines"). Moreover, the pipe is of the type having a non-smooth passage (known as "rough bore"), that is to say that the fluid circulating within the tubular pipe 1 is in contact with the metal carcass 10, the said carcass 10 being the first layer to be facing the axis A-A'. In the context of the invention, the flexible tubular pipe 1 is exclusively of the "rough bore" type.

The various different layers arranged concentrically to the longitudinal axis A-A, from the one situated closest to the said axis to the one located farthest away from the axis, are the following:

a metal carcass 10 formed by the short pitched winding, at a winding angle in particular comprised between 70° and 90° relative to the axis A-A', of a profiled strip and defining a flow area for the through passage of a hydrocarbon fluid;

an inner polymeric sealing sheath 11 or "pressure sheath" disposed around the metal carcass 10, designed to absorb the forces exerted by the hydrostatic pressure and to avert any risk of collapse of the carcass 10;

at least one metal armour layer such as, for example a ply of pressure resistant armouring 12 or "pressure vault" formed by the short pitched winding, typically at a lay angle of between 70° and 90°, of formed metal wires with Z-, T-, U-, K-, X-, or I shaped profiles around the pressure sheath 11. The said pressure vault 12 is designed to absorb the axial compressive forces exerted by the flow within the flow area of the hydrocarbon fluid under pressure; or indeed at least one ply of armour resistant to tensile forces 13, 14 formed by the long pitched winding, typically at a winding angle comprised between 20° and 55° of formed metal wires over the pressure vault 12 in order to absorb the longitudinal tension stresses; and an outer polymeric sheath 15 or "outer sheath" disposed around the at least one metal armour layer 12; 13, 14 in order to protect these latter from all external physical damage.

Quite obviously, other intermediate layers formed from an extruded polymeric material either with or without loads, or indeed based on the assembly in self-locked or non self-locked configuration of metal strips, of metal wires or a combination of these two, may be interposed between the layers previously mentioned above.

Moreover, in the case where the flexible tubular pipe 1 has a "balanced structure", at least two plies of armour resistant to tensile forces 13, 14 are wound around the pressure sheath 11, at a winding angle of between 50° and 60°.

In addition, envisaging the use of polymeric sheaths as a heat shield or as a sheath with low permeability that traps the corrosive gases, such as an anti-$H_2O$, anti-$H_2S$ or anti $CO_2$ sheath, is entirely possible and without limitation.

In the description of the invention which follows, the term "upstream" is used to refer to the proximal end of the metal carcass 10 which opens out to the external environment and in contrast, the term "downstream" is used to refer to the distal end of the metal carcass 10 which is the farthest away from the external environment, as opposed to the upstream end of the metallic carcass 10.

It should also be noted that the significance of the terms "towards the interior or inward", "inner" and "internal" are identical and refer to any element or part of an element situated closer to the longitudinal axis A-A'. Conversely, the significance of the terms "towards the exterior or outward", "outer" and "external" are identical and refer to any element or part of an element situated farthest away from the longitudinal axis A-A'.

The flexible tubular pipe 1 according to the invention, as described here above is designed to be assembled together with a secondary metal tube 2. The purpose of this assembly in particular is to fabricate a monitoring device for checking and monitoring the movement or displacement of the metal carcass 10 by making use of an ultrasound sensor.

Indeed, the "riser" type flexible pipes 1 are subjected to the withstanding of tensile forces induced by the weight of the structure. As the depth of water to be reached increases so also do these forces increase in strength. That is why it is of interest to focus on the movement of the metal carcass 10 relative to the various constituent layers of the flexible pipe 1 so as to be able to assess the impact that the tensile stress can have on the latter.

The monitoring device for checking and monitoring by means of ultrasonic measurements the movement of the metal carcass 10 is composed of an electrical power supply system connected to a transducer 80, of the secondary metal tube 2 and a data acquisition and/or data visualisation system. More precisely, the monitoring device relates to an ultrasound echography method by means of reflection.

Illustrated in the FIGS. 6a and 6b, the secondary metal tube 2 is installed inside the metal carcass 10 and is held together with the latter in an integrally secure manner by making use of a fastening element 3 (not represented so as to ensure greater clarity). The probe 80 is positioned on the outer surface of an vault 61 of a fastening end fitting 60 and is connected to an electrical power supply system (not shown) located a few meters away from the flexible tubular pipe 1. In order to detect the presence (FIG. 6a) or the non-presence (FIG. 6b) of the carcass 10 to the right of the transducer 80, the transducer 80 emits an ultrasonic wave, the frequency of which is between 500 kHz and 2 MHz, into the thickness of the vault 61 of the end fitting 60. The frequency of the wave is selected in relation to the nature and the thickness of the structural element or elements to be passed through as well as to the desired spatial resolution.

Once the inner surface of the vault 61 has been reached, a portion of the wave is reflected back to the transducer 80 and another portion is transmitted within the thickness of the secondary metal tube 2. In the presence of the secondary metal tube 2, the echo of the wave reflected back to the transducer 80 is greatly attenuated because a metal/metal interface decreases the amplitude of the reflected wave. However, when the secondary metal tube 2 is no longer present to the right of the probe 80, the echo of the wave reflected is less attenuated because a metal/petroleum fluid or metal/vacuum interface decreases in a minimal fashion the amplitude of the reflected wave. If the secondary metal tube 2 has left its initial position, the pipe 1 used for performing the extraction of the petroleum fluid is stopped and an inspection of the interior thereof is generally programmed in order to determine the magnitude of the movement of the metal carcass 10 relative to the other constituent layers of the pipe 1.

Now a detailed description shall be provided with respect to what constitutes the assembly according to the invention and the method to be used for the fabrication thereof.

Figures 2, 3:
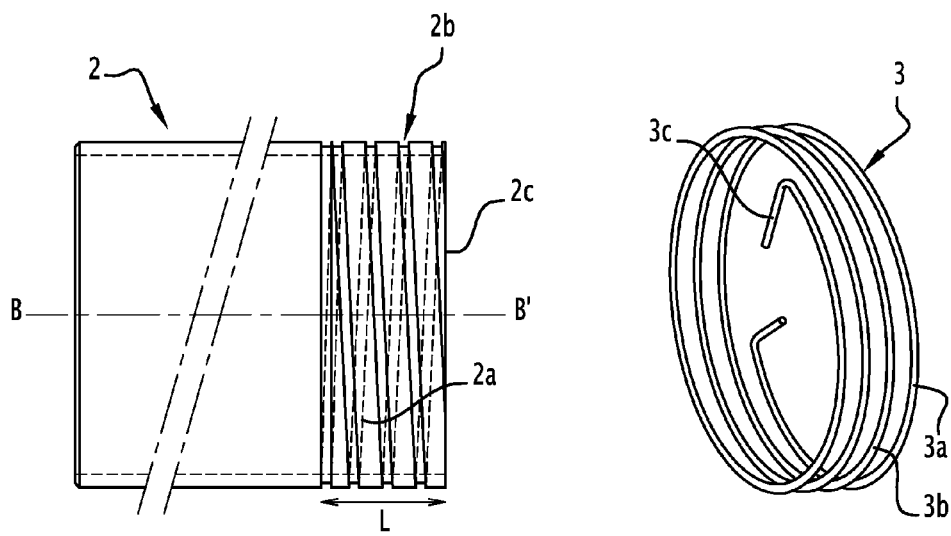
FIG. 2 is an overall view of a fastening element as a whole according to the invention.
FIG. 3 is a partial schematic view of a metal tube.

The assembly of the said tubular pipe 1 joined with the said metal tube 2 is fabricated by making use of a fastening element 3 as represented in the FIG. 2. The fastening element 3 is a helical coil spring obtained by means of the operation of spiral winding of a steel wire whose pitch is chosen to be equal to the mean pitch of the metal carcass 10. The steel used is preferably of the same nature as the steel used for the fabrication of the metal carcass 10, for example a stainless steel. According to the invention, the spiral coiled wire for the fabrication of the spring 3 has a circular cross section. In a variant embodiment, the spiral coiled wire has a profiled section of a shape complementary to the shape of the cavity defined by the plurality of intervening gaps 10a of the strip of the metal carcass 10. This type of profiled section makes it possible to increase the surface area of contact between the spiral coiled wire and the plurality of intervening gaps 10a formed by the winding of the profiled strip and hence the maximum permissible stress for the assembly.

The spring 3 comprises at least two turns 3a, 3b, preferably four turns, that are non-touching and is provided with at least one threaded fastening tab 3c, formed at least at one of its two ends. Advantageously, the spring 3 comprises two threaded fastening tabs 3c extending radially while also coming to be faced towards the interior of the volume defined by the inner diameter of the turns 3a, 3b. The fastening tabs 3c are configured in a manner such that they enable the setting in place of the spring 3 within the metal carcass 10. In order to do this, use is made of an installation device 4, which comprises the fastening means 4b on which the fastening tabs 3c will come to be temporarily fastened.

The fastening of the fastening tabs 3c leads to a reduction of the diameter of the spring 3, which thus allows for the insertion thereof within the interior of the carcass 10. Subsequently, the fastening tabs 3c are released from the fastening means 4b of the installation device 4, resulting in the expansion of the turns 3a, 3b of the spring 3 within the plurality of intervening gaps 10a of the metal carcass 10.

The secondary metal tube 2 illustrated in the FIG. 3 is configured for cooperating coaxially with the carcass 10 of the tubular pipe 1 by means of the helical coil spring 3 installed in advance within the interior of the carcass 10. The said outer diameter of the metal tube 2 is nevertheless adjusted to fit as close as possible to the inner diameter of the carcass 10 in order that it can be inserted and hence, be assembled together with a minimum clearance. The secondary metal tube 2 has at one of its ends a thread 2a formed in the thickness of its outer surface. The thickness of the secondary metal tube 2, defined by the ratio between its outer diameter and its inner diameter, depends on the diameter of the metal carcass 10 and should be relatively thick in order to ensure that the forming of the thread 2a does not result in embrittlement of the said secondary metal tube 2. The thickness of the secondary metal tube 2 is comprised between five millimeters and twenty millimeters, preferably between ten millimeters and fifteen millimeters.

The thread 2a defines a groove 2b extending helically over the outer surface of the metal tube 2 relative to a longitudinal axis B-B', the pitch of which is substantially equal to the mean pitch of the winding of the profiled strip of the metal carcass 10, that is to say to the short pitch, corresponding to the helix angle that the groove 2b makes relative to the axis B-B' (or A-A') and which is in particular comprised between 70° and 90°. The groove 2b is machined from a flange 2c situated on the end of the tube, over a length L. The height h of the groove 2b is between two and three millimeters, advantageously, h is equal to two point five millimeters.

The width/of the groove 2b depends on two parameters specified in the following formula:

$$l = \left(\frac{n}{2} - \frac{1}{2}\right) \times \Delta p$$

With:
Δp, being the difference between the minimum pitch and the maximum pitch of the carcass 10, taken into account for the formation of the thread 2a; and
n, being the number of turns of the spring 3 selected for assembling the tubular pipe 1 and the secondary metal tube 2.

The length L along which the groove 2b extends, also depends on the parameters described here above, namely: the width l of the groove 2b, the difference Δp between the minimum pitch and the maximum pitch of the carcass 10, taken into account for the formation of the thread 2a, as well as the number n of turns of the spring 3. The values of the minimum pitch and maximum pitch are grouped together in the data tables provided by the manufacturer of the pipe. These values may also be verified by means of measurements carried out on the production line of the flexible pipes designed for receiving the monitoring device or measured afterwards. The number of turns n of the spring 3 is chosen to be equal to at least two turns, preferably equal to four turns, and generally does not exceed five turns in order to ensure sufficient contact between the metal carcass 10 and the secondary metal tube 2. By taking into consideration these parameters as well as the diameter of the metal carcass 10, it is possible to define a minimum length L over which the groove 2b describes at least one revolution. It is also possible to define a maximum length L over which the groove 2b describes at least five revolutions. In the case where L is the maximum, the pitch of the thread 2a should be determined with precision in order to ensure that the close fit between the carcass 10 and the secondary metal tube 2 remains consistent, that is to say that there is sufficient contact between the spring 3 and the groove 2b of the secondary metal tube 2 over the entire length L. The assessment of the contact between the elements 2 and 3 of the assembly is based on the general knowledge of the person skilled in the art and allows for taking into account variations in the pitch of the metal carcass 10 along the length L.

The method for assembling the metal carcass 10 of the flexible tubular pipe 1 with a secondary metal tube 2, more specifically the various different steps necessary for the fabrication thereof, are illustrated in the FIGS. 4a to 4d.

Figure 4A:
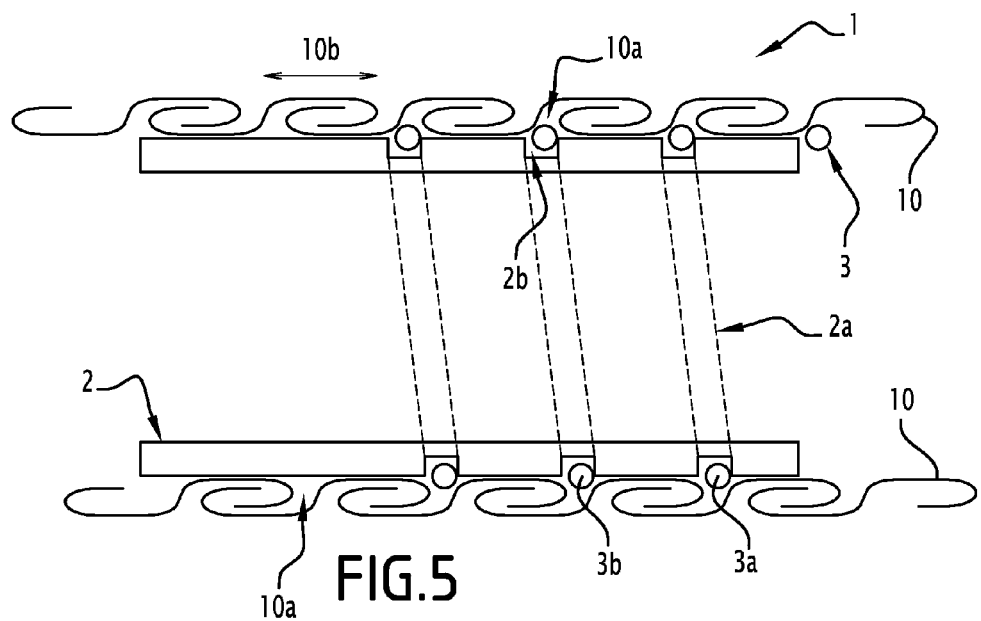
FIGS. 4a, 4b, 4c and 4d are detailed views of the various successive steps in the assembly of a tubular pipe and a secondary metal tube, in accordance with the invention.
Figure 4A:
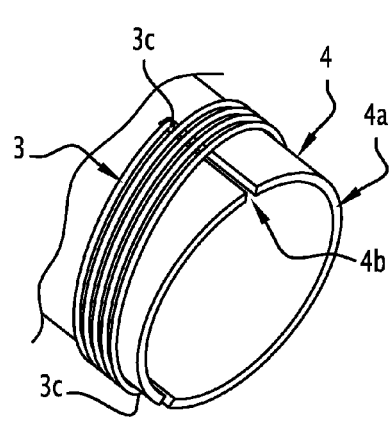

The FIG. 4a describes the first step of the assembly method, that is to say the fastening of the helical coil spring 3 on to the installation device 4. The installation device 4 used here, is fabricated by making use of a polymeric material, more precisely with polyvinyl chloride or PVC, extruded in the form of a tube. However, the tube 4 may also be made out of steel, preferably with stainless steel. At one of its ends 4a, the tube 4 has a recess 4b that enables the fastening of the spring 3. In fact, the turns of the spring 3 are first of all compressed axially, and then the spring 3 is fitted onto the installation tube 4 and, ultimately, the fastening tabs 3c of the spring 3 are inserted into the notch 4b of the said tube 4. In an advantageous manner, the fastening tabs 3c are securely held by means of radial locking with the installation tube 4, the bolts are put back on and then screwed on to the threaded ends of the fastening tabs 3c.

Figure 4B:
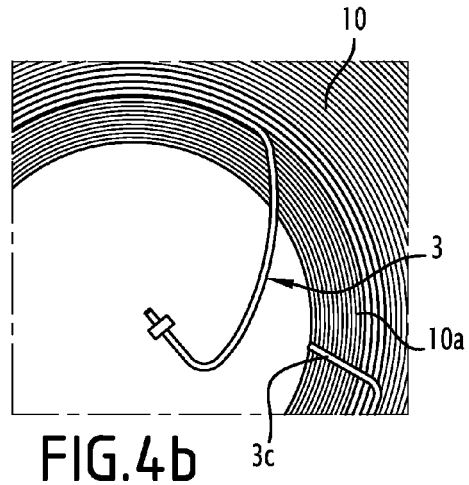

When the spring 3 is hooked on to the installation tube 4, the tube 4 is inserted by sliding into the interior of the metal carcass 10 along the axis A-A and, as illustrated in the FIG. 4b, the at least two turns 3a, 3b of the spring 3 are adjusted to fit with the plurality of intervening gaps 10a of the metal carcass 10. As the outer diameter of the at least two turns 3a, 3b is chosen to be equal to 110% of the inner diameter of the metal carcass 10, when the bolts are removed, the at least two turns 3a, 3b extend radially, releasing the spring 3 of the installation tube 4 and ensuring its insertion within the intervening gaps 10A.

It should also be noted that the anchoring of the spring 3 in the intervening gaps 10a is dependent on the pitch of the carcass 10. In the case where the pitch of the carcass 10 is maximum, that is to say when the interstitial spacing is maximum, the distance between the inner diameter of the carcass 10 and the inner diameter of the spring 3 is at least equal to 1.5 millimeters.

And, in a manner such that the connection between the secondary metal tube 2 and the metal carcass 10 is possible, the upstream fastening tab 3c is broken by making use of a suitable tool, for example a cutting plier.

According to a variant installation mode, if it is difficult to fit the spring 3 within the interior of the carcass 10 on account of a very limited radial clearance, the spring 3 is then cut into multiple segments of 120°. Each segment is inserted one after the other into the intervening gaps 10a of the metal carcass 10 by making use of a lubricating agent, which provides the ability to gradually, piece by piece reconstitute the spring 3 and to make possible the installation of the secondary metal tube 2.

Figure 4C:
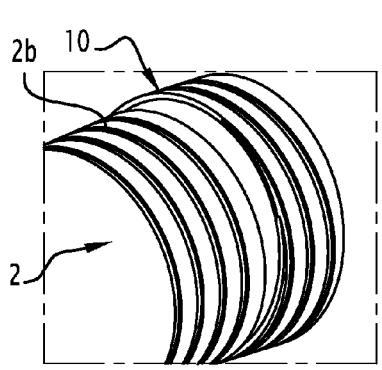

Next to the FIG. 4c is illustrated the secondary metal tube 2. It is initially centered axially in relation to the metal carcass 10, inside which the spring 3 has been installed in advance. Then, it is inserted into the interior of the metal carcass 10. The threaded groove 2b within the thickness of the secondary pipe 2 appropriately shaped so as to cooperate with the turns 3a, 3b of the spring 3 provides the ability to assemble the said turns 3a, 3b with the tube 2, joined together by means of a screwing operation. Thus, the metal tube 2 is now connected with the metal carcass 10.

Figure 4D:
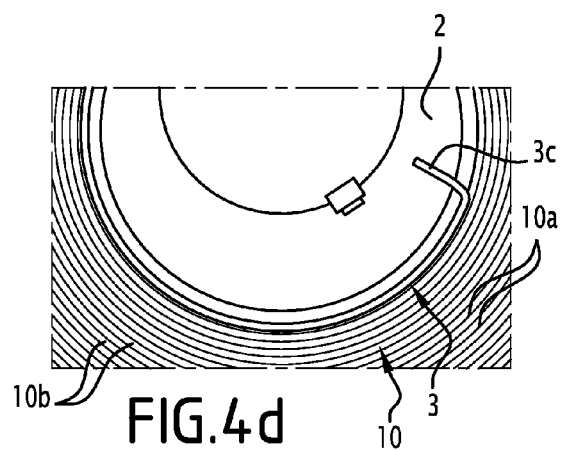

The final step of the assembly method is illustrated in the FIG. 4d. Once the secondary tube 2 has come to a stop against the downstream fastening tab 3c, the screwing operation is considered to be completed and the secondary metal tube 2 is then locked with respect to translational movement relative to the metal carcass 10. Preferably, the tube 2 will also be locked with respect to rotational movement relative to the carcass 10. In order to do this, a hole is drilled into the secondary metal tube 2 at the end of the downstream fastening tab 3c and then the spring 3 and the tube 2 come to be secured together, by means of a bolting operation.

In an optional manner, it is possible to cast a polymeric resin, for example an epoxy resin, at the level of the spring 3 and more particularly between each turn, so as to increase the resistance of the assembly and therefore its mechanical strength.

Although the secondary metal tube 2 is held stationary with respect to translational movement and rotational movement relative to the metal carcass 10, it may nevertheless be easily dismantled if this is necessary, and without having the metal carcass 10 being subject to any damage. The assembly that the invention provides is optimised to be fully assembled and disassembled at will.

The completed assembly is shown in FIG. 5, where only the metal carcass 10 of the flexible tubular pipe 1 is represented. The metal carcass 10 formed by the helical winding of a plurality of profiled strips stapled to each other, defines a profile of a section with an alternation of intervening gaps 10a interposed between two turns 10b, capable of receiving at least two non-touching turns 3a, 3b of the fastening element of the spring 3.

The secondary metal tube 2 having the thread 2a defining the groove 2b is screwed in to the spring 3 by cooperation with the groove 2b with the at least two turns 3a, 3b of the said spring 3, it is shown to be stationary with respect to translational movement and rotational movement relative to the metal carcass 10. According to the FIG. 5, the assembly as illustrated may be considered as functional and ready to use.

Quite obviously, the embodiments previously described above are only provided by way of non-limiting examples. Other variants of implementation and embodiments may be produced without in any way departing from the scope of the invention.

What is claimed is:

1. An assembly comprising:
a flexible tubular pipe for transporting hydrocarbon fluids, the pipe comprising a set of concentric, unbonded layers including at least, from inside the pipe outward:
a metal carcass made by the short pitched helical winding of a profiled strip, said strip defining a plurality of intervening gaps between each winding turn,
an inner polymeric sealing sheath;
at least one metal armour layer; and
an outer polymeric sheath;
with a secondary metal tube coaxial to the tubular pipe, a fastening element comprising at least two non-touching turns of a helical coil spring inserted within the metal carcass, wherein said fastening element cooperates with the plurality of intervening gaps and wherein at least one of the ends of the said secondary metal tube has a short pitched thread defining a helical groove, said groove being screwed onto the at least two non-touching turns of the said fastening element to mount the flexible tubular pipe with the secondary metal tube via the fastening element.

2. An assembly according to claim 1, wherein the diameter of the said at least two non-touching turns of the fastening element is chosen to be equal to 110% of the inner diameter of the profiled strip of the metal carcass.

3. An assembly according to claim 1, wherein the at least two turns of the fastening element in contact with the plurality of intervening gaps exert a radial force on the carcass.

4. An assembly according to claim 1, wherein the distance between the inner diameter of the metal carcass and the inner diameter of the fastening element is at least equal to 1.5 millimeters.

5. An assembly according to claim 1, wherein the fastening element includes at least at one of its ends, a fastening tab which extends radially and towards the interior of the volume defined by the diameter of the turns.

6. An assembly according to claim 1, wherein the at least two non-touching turns of the fastening element are formed by an operation of spiral winding of a steel wire.

7. An assembly according to claim 6, wherein the steel wire is made out of stainless steel.

8. An assembly according to claim 6, wherein the steel wire is of a circular cross section.

9. An assembly according to claim 6, wherein the steel wire is of a profiled cross section.

10. An assembly according to claim 1, wherein the fastening element fastened to the metal carcass is resistant to a tensile force of between 2 tonnes and 10 tonnes.

11. A method for mounting an assembly of a flexible tubular pipe with a secondary metal tube according to claim 1, including the following steps:
a) fastening the fastening element on to one of two ends of an installation device,
b) inserting the installation device relative to the metal carcass;
c) adjusting the fastening element relative to the metal carcass;
d) releasing the fastening element;
e) removing the installation device;
f) positioning and inserting the secondary metal tube relative to the metal carcass; and
g) securing the fastening element to the said secondary metal tube.

12. A method according to claim 11, wherein the step a) comprises a step $a_1$) of bringing about axial compression of the turns, then a step $a_2$) of insertion of the at least one fastening tab of the fastening element into at least one notch provided at one of the ends of the installation device.

13. A method according to claim 11, wherein the step d), has a phase of radial expansion of the turns (3a, 3b) of the fastening element (3) within the plurality of intervening gaps (10a) of the metal carcass (10).

14. A method according to claim 11, wherein the step f) includes a step $f_1$) of coaxial centering of the secondary metal tube relative to the inner diameter of the metal carcass and then a step $f_2$) of screwing of the groove of the secondary metal tube into the turns of the fastening element.

15. A method according to claim 11, wherein the step g) comprises an operation of bolting of the at least one fastening tab of the fastening element with the secondary metal tube.

16. A method according to claim 11, including after the step g), a step $g_1$) of application of a polymer resin between the turns of the fastening element and the secondary metal tube.

17. A method according to claim 11, wherein the step f) includes a step $f_1$) of coaxial centering of the secondary metal tube (2) relative to the outer diameter of the metal carcass (10) and then a step $f_2$) of screwing of the groove (2b') of the secondary metal tube (2) into the turns (3a, 3b) of the fastening element (3).

18. An assembly according to claim 10, wherein the fastening element is able to with stand a tensile force of 5 tons.

19. A method according to claim 12, wherein the step a2) is followed by a bolting of the said at least one fastening tab relative to the notch.

* * * * *